(12) United States Patent
Eom (10) Patent No.: US 6,295,116 B1
(45) Date of Patent: Sep. 25, 2001

(54) OPTICAL SCANNING SYSTEM FOR PRINTER

(75) Inventor: Yoon-seop Eom, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 30 days.

(21) Appl. No.: 09/624,241

(22) Filed: Jul. 24, 2000

(30) Foreign Application Priority Data

Jul. 29, 1999 (KR) .................................................. 99-31056

(51) Int. Cl.[7] .......................... G03B 27/32; G03B 27/52; H01J 3/14; B41J 2/01; G03G 15/04
(52) U.S. Cl. ................................. 355/32; 355/41; 355/45; 355/47; 250/234; 250/235; 347/101; 347/187; 347/215; 347/225; 347/231; 399/32; 399/51; 399/78
(58) Field of Search .................................. 355/32, 41, 45, 355/47; 250/234, 235; 347/101, 187, 215, 225, 231; 399/32, 51, 78

(56) References Cited

U.S. PATENT DOCUMENTS

| | | |
|---|---|---|
| 5,138,479 | 8/1992 | Ando . |
| 5,255,063 | 10/1993 | Ideyama et al. . |
| 5,365,364 | 11/1994 | Taylor . |
| 5,392,060 | * 2/1995 | Imakawa .............................. 347/240 |
| 5,606,449 | 2/1997 | Nishiyama . |
| 5,724,087 | * 3/1998 | Sugano et al. ........................ 347/243 |
| 5,926,203 | * 7/1999 | Shimura et al. ...................... 347/238 |
| 5,987,193 | * 11/1999 | Eguchi et al. ........................ 382/318 |
| 6,043,484 | 3/2000 | Park . |
| 6,072,176 | 6/2000 | Kohsaka et al. . |

* cited by examiner

*Primary Examiner*—Russell Adams
*Assistant Examiner*—Khaled Brown
(74) *Attorney, Agent, or Firm*—Robert E. Bushnell, Esq.

(57) ABSTRACT

An optical scanning system for a printer includes an optical scanning unit having a deflector divided into a plurality of deflection regions to allow repetitive scanning of light emitted from a light source by rotation, the optical scanning unit for scanning light onto a photosensitive belt traveling around a plurality of rollers; a first photodetector installed at a position separated from the edge of the photosensitive belt, to be able to receivable light scanned beyond the edge of the photosensitive belt; a second photodetector installed a predetermined distance apart from the first photodetector, to be able to receive light scanned just beyond the edge of the photosensitive belt until the light hits the edge of the photosensitive belt; a scanning reference position signal generator for generating a scanning reference position signal at a point in time at which a signal output from the first photodetector in response to the reception of light, and a signal output from the second photodetector in response to the reception of light have the same level; an edge pulse generator for generating an edge pulse signal whose width corresponds to the period from the reception of the scanning reference position signal until the light reception of the second photodetector is terminated; and a controller for calculating the degree of deviation from a reference track of the photosensitive belt, in a direction perpendicular to the traveling direction of the photosensitive belt, using the width of the edge pulse signal, and controlling the driving of the optical scanning unit such that light corresponding to image information is emitted onto the photosensitive belt, starting from the starting point of an image print region of the photosensitive belt. The optical scanning system can reduce error in printing image information onto the image print region of the photosensitive belt even though there are variations in the amount of light scanning onto the photosensitive belt from the optical scanning unit.

24 Claims, 6 Drawing Sheets

OPTICAL SCANNING SYSTEM FOR PRINTER

CLAIM OF PRIORITY

This application makes reference to, incorporates the same herein, and claims all benefits accruing under 35 U.S.C. §119 from an application entitled Image Printing Apparatus earlier filed in the Korean Industrial Property Office on Jul. 29, 1999, and there duly assigned Ser. No. 99-31056 by that Office.

BACKGROUND OF THE INVENTION

1. Field of the Invention

The present invention relates to optical scanning systems for printers, and more particularly, to an optical scanning system for a printer that suppresses image print errors on a photosensitive belt due to variations in the amount of light repeatedly scanned by the photosensitive belt from an optical scanning unit.

2. Description of the Related Art

A printer may reproduce images or text on a photosensitive medium such as a photosensitive (or photoreceptor) belt to which toner is applied. Where a light beam strikes the photosensitive belt, it will hold developer for transfer to a sheet of paper.

An image is formed on the photosensitive belt by scanning the beam of light onto the photosensitive belt. Multiple rollers circulate the photosensitive belt, while a development unit develops the image to be printed on a transfer surface of the photosensitive belt. The developed image on the photosensitive belt is transferred to the paper or other printable medium when it passes the transfer unit.

For a high quality image to be printed, the positioning of the image on the photosensitive belt is important. One problem that occurs is that the image print starting position is irregularly set along the edge of the photosensitive belt in the traveling direction.

Exemplar of the background art U.S. Pat. No. 6,072,176 for Laser Beam Optical Scanning Device and Image Forming Apparatus with Laser Beam Optical Scanning Device issued to Kohsaka et al., U.S. Pat. No. 6,043,484 for Printer Optical Scanning Apparatus and Color Printer Optical Scanning System issued to Park, U.S. Pat. No. 5,138,479 for Light Beam Scanning Apparatus and Method of Detecting a Variation of a Scanning Speed of a Light Beam issued to Ando, U.S. Pat. No. 5,606,449 for Optical Scanning Device issued to Nishiyama, U.S. Pat. No. 5,365,364 for Optical Scanner and Printer issued to Taylor, U.S. Pat. No. 5,255,063 for Color Copying Apparatus with Improved Start Timing of a Scanner issued to Ideyama et al. disclose optical scanning systems for printers. I have found that the art does not show a way to reduce the irregularity of the starting position of the image print on a photosensitive medium of a printer.

SUMMARY OF THE INVENTION

To solve the above problems, it is an objective of the present invention to provide an optical scanning system for a printer, in which an image print error due to variations in an amount of light repeatedly scanning a photosensitive belt after being emitted from an optical scanning unit can be suppressed.

It is another object to have a higher quality of printing though a more accurate optical scanning system for a printer.

It is yet another object to have a scanning system for a printer that reduces errors in the starting position of the image print placed on a photosensitive medium of the printer.

It is still yet another object to have a printer that has the same image print starting position in each line scanned onto a photosensitive medium of the printer.

To achieve the objective of the present invention, there is provided an optical scanning system for a printer having an optical scanning unit having a deflector divided into a plurality of deflection regions to allow repetitive scanning of light emitted from a light source by rotation, the optical scanning unit for scanning light onto a photosensitive belt traveling around a plurality of rollers; a first photodetector installed at a position separated from the edge of the photosensitive belt, to be able to receivable light scanned beyond the edge of the photosensitive belt; a second photodetector installed a predetermined distance apart from the first photodetector, to be able to receive light scanned just beyond the edge of the photosensitive belt until the light hits the edge of the photosensitive belt; a scanning reference position signal generator for generating a scanning reference position signal at a point in time at which a signal output from the first photodetector in response to the reception of light, and a signal output from the second photodetector in response to the reception of light have the same level; an edge pulse generator for generating an edge pulse signal whose width corresponds to the period from the reception of the scanning reference position signal until the light reception of the second photodetector is terminated; and a controller for calculating the degree of deviation from a reference track of the photosensitive belt, in a direction perpendicular to the traveling direction of the photosensitive belt, using the width of the edge pulse signal, and controlling the driving of the optical scanning unit such that light corresponding to image information is emitted onto the photosensitive belt, beginning from the starting point of an image print region of the photosensitive belt.

Preferably, the optical scanning system further has a belt steering portion for controlling one of the rollers for use in steering the photosensitive belt, to allow the traveling of the photosensitive belt along the reference track, where the controller calculates the amount of deviation from the reference track of the photosensitive belt, using the width of the edge pulse signal, and controls the belt steering portion to reduce the amount of deviation.

Preferably, the first and second photodetectors are separated from each other to the extent that both the first and second photodetectors share a light spot emitted from the optical scanning unit at the middle point between the first and second photodetectors.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
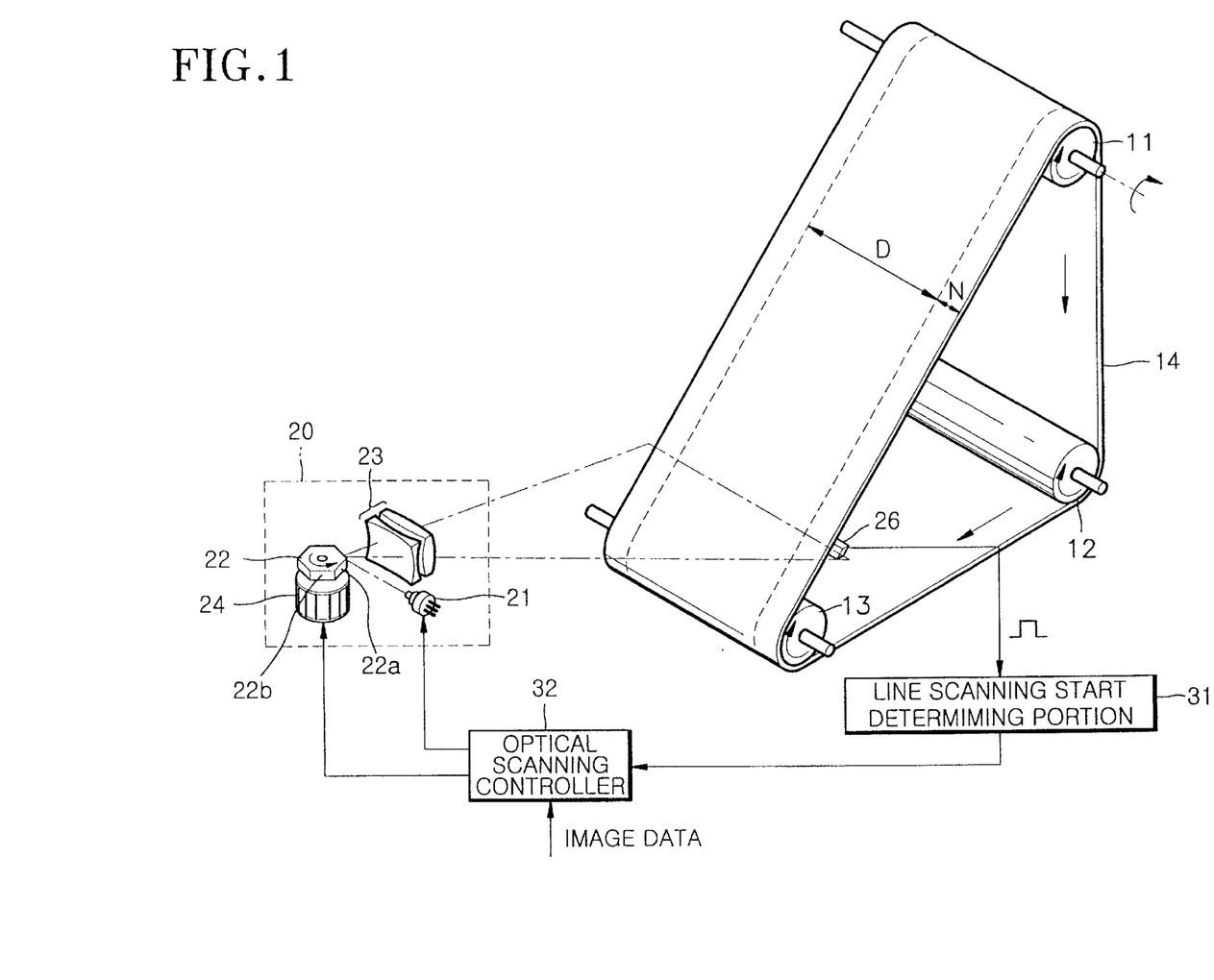
FIG. 1 is a diagram showing an optical scanning system for a printer.

Turning now to the drawings, FIG. 1 shows an optical scanning system in a printer. Referring to FIG. 1, the printer includes an optical scanning unit 20 for scanning light onto a photosensitive belt 14 traveling around three rollers 11, 12 and 13, a photodetector 26, a line scanning start determining portion 31 and an optical scanning controller 32. The optical scanning unit 20 includes a light source 21, a rotary polygon mirror 22, which rotates at a constant speed driven by a driving source 24, and a lens unit 23.

The photodetector 26 is installed to enable detection of light scanning from a deviation point to the edge of the photosensitive belt 14, which is emitted from the optical scanning unit 20.

The line scanning start determining portion 31 generates a line scanning start signal after a predetermined time delay determined from the end point of a pulse signal. Here, the pulse signal is generated in response to the light reception of the photodetector 26. Thus, the predetermined time delay corresponds to the time duration required for light to scan through a non-print region N between the edge of the photosensitive belt 14 and an image print region D.

The optical scanning controller 32 controls the driving of the light source 21 to allow emission of light according to line image data in synchronicity with the line scanning start signal.

Figure 2:
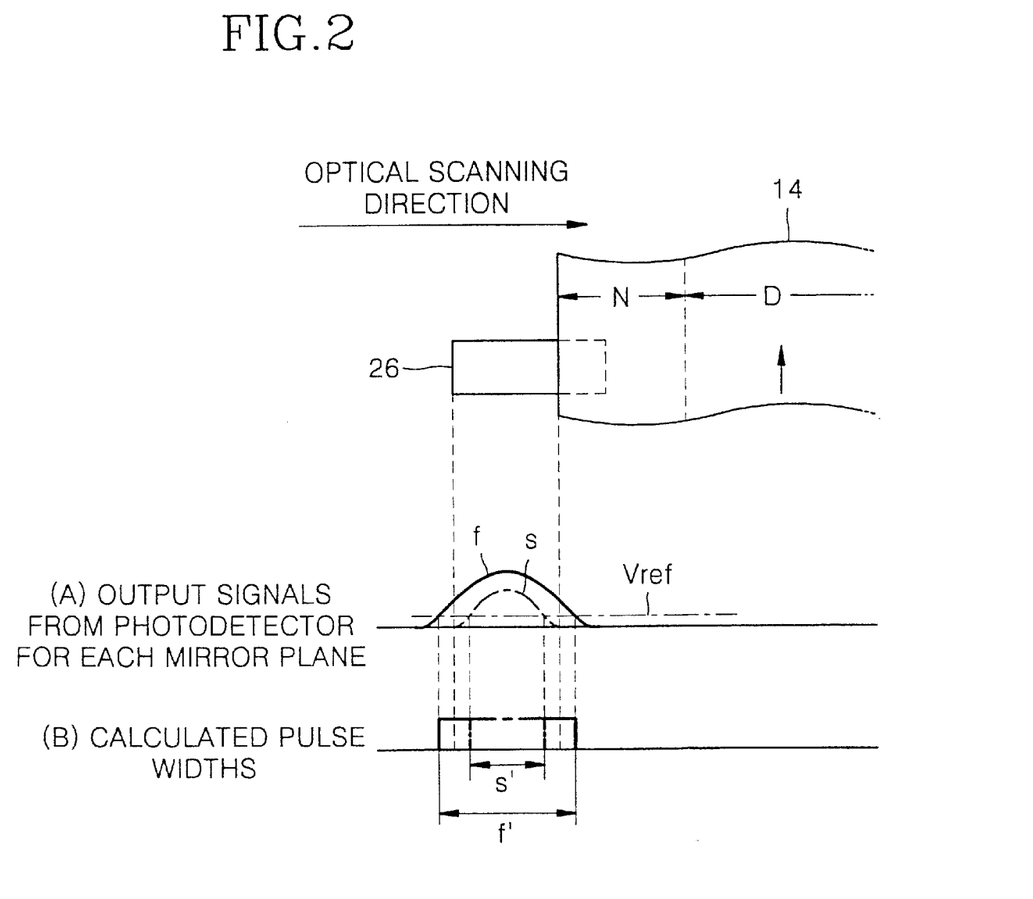
FIG. 2 illustrates the variation of pulse signals output from a photodetector due to difference in the amount of light reflected by each mirror side of the rotary polygon mirror shown in FIG. 1.

However, in such an optical scanning system, the amount of light reflected from the rotary polygon 22 is different between mirror sides 22a and 22b. Variations in the amount of light reflected by the first and second mirror sides 22a and 22b are caused by processing errors, i.e., the surface roughness of the sides. As an example, if the levels of output signals f (corresponding to the first mirror side 22a) and s (corresponding to the second mirror side 22b) from the photodetector 26 are different due to a variation in the amount of light reflected by the first and second mirror sides 22a and 22b, as shown in FIG. 2A, the pulse widths f' (corresponding to the first mirror side 22a) and s' (corresponding to the second mirror side 22b) become different as shown in FIG. 2B. Here, the pulse widths f' and s' are determined by comparison of the output signals from the photodetector 26 with a predetermined reference level Vref. According to a line scanning technique using an optical scanning system, the pulse widths vary depending on the difference in the amount of light reflected from each mirror side 22a and 22b, so that an image print starting position is varied in each line scanning onto the photosensitive belt 14. As a result, the image print starting position is irregularly set along the edge of the photosensitive belt 14, in a traveling direction, with a predetermined cycle corresponding to the number of mirror sides of the rotary polygon mirror 22 used.

Figure 3:
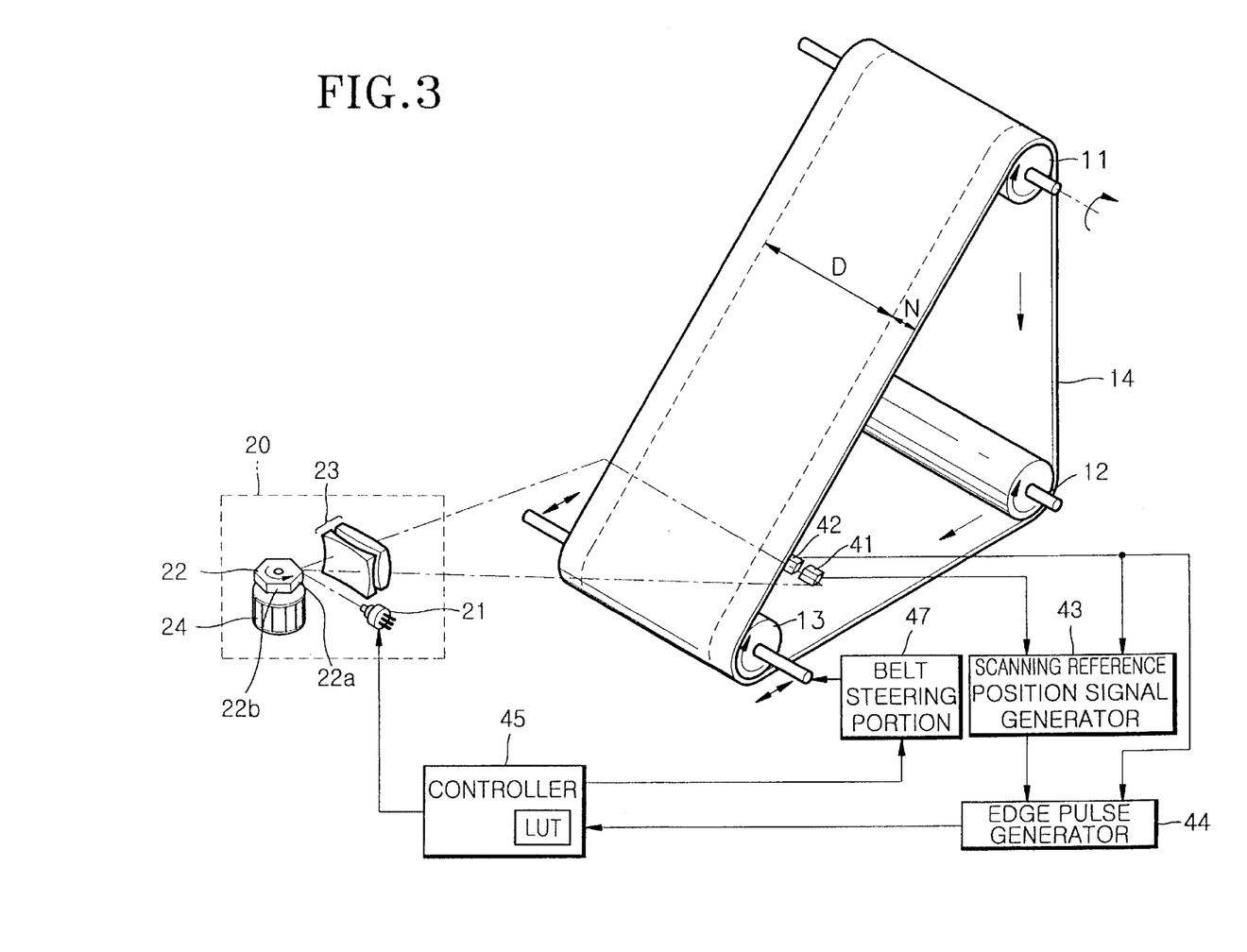
FIG. 3 is a diagram showing a preferred embodiment of an optical scanning system for a printer according to the present invention.

Referring to FIG. 3, a preferred embodiment of an optical scanning system for a printer according to the present invention includes an optical scanning unit 20, a first photodetector 41, a second photodetector 42, a scanning reference position signal generator 43, an edge pulse generator 44 and a controller 45.

Figure 6:
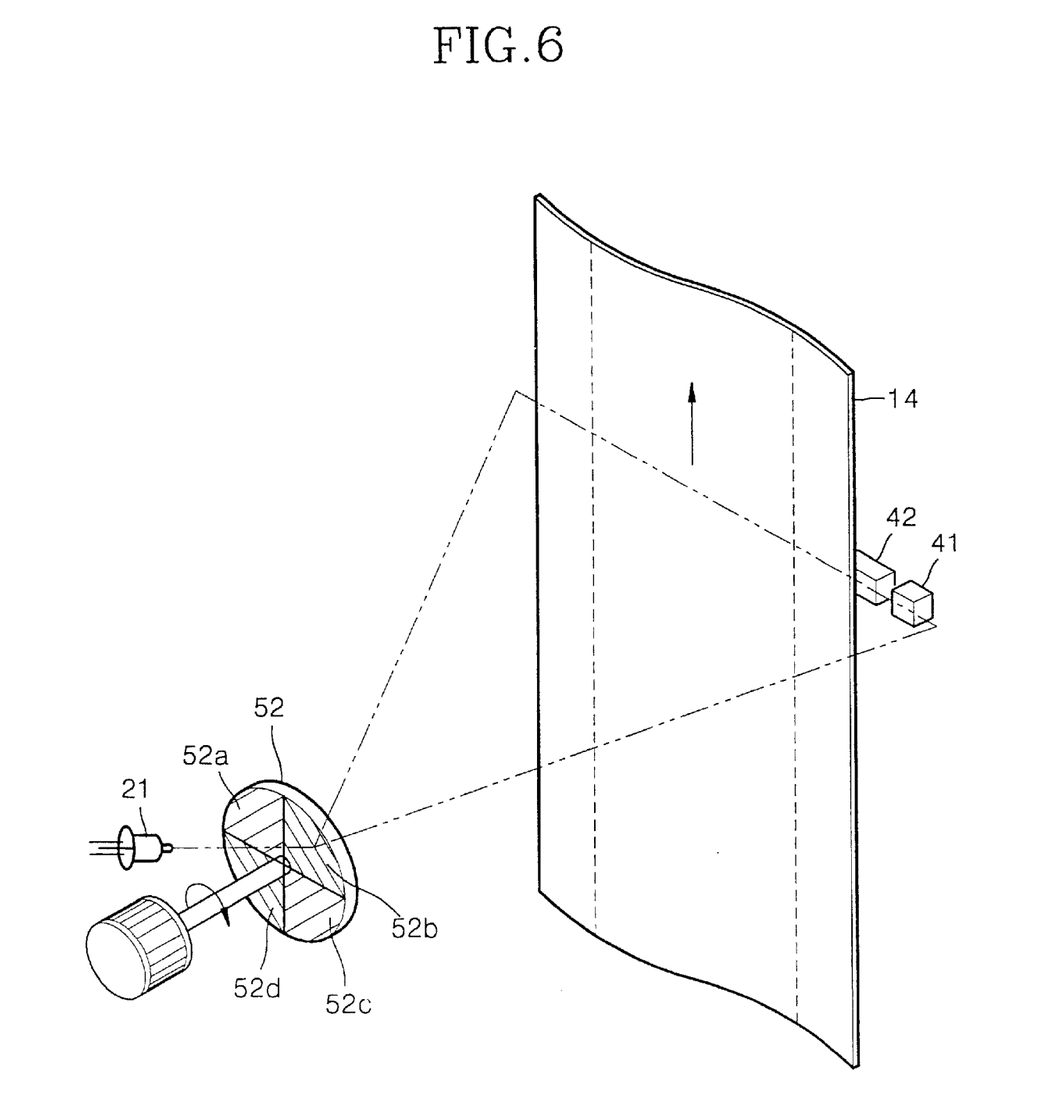
FIG. 6 shows another example of the optical scanning unit applicable to the optical scanning system according to the present invention.

The optical scanning unit 20 includes a light source 21, a rotary polygon mirror 22 and a lens unit 23. The rotary polygon mirror 22 with a plurality of mirror sides, including mirror sides 22a and 22b, is a kind of a deflector for repeatedly scanning light emitted from the light source 21 onto the photosensitive belt 14 by the rotation of a driving source 24. Another example of the deflector may be a hologram disc 52, as shown in FIG. 6, which is divided into a plurality of deflection areas 52a, 52b, 52c and 52d, and has a diffraction grating in each deflection area for diffracting and scanning light emitted from the light source 21 onto the photosensitive belt 14.

The first and second photodetectors 41 and 42 are spaced apart a predetermined distance. The first photodetector 41 is installed at a position separated a predetermined distance from the edge of the photosensitive belt 14. The first photodetector 41 receives light, which is emitted from the optical scanning unit 20 and scanned beyond the edge of the photosensitive belt 14, and outputs a signal corresponding to the received light.

The second photodetector 42 is installed partially hidden behind the photosensitive belt 14, as shown in FIG. 3, and receives light emitted from the optical scanning unit 20 and scanned just beyond the edge of the photosensitive belt 14, until the light hits the edge of the photosensitive belt 14. The distance between the first and second photodetectors 41 and 42 is determined such that light scanning the middle point of the two photodetectors forms a light spot on both the first and second photodetectors 41 and 42, centered exactly between the photodetectors. The intensity of the light spot may vary according to the amount of light reflected from each mirror side 22a, 22b, etc. of the rotary polygon mirror 22, or transmitted through each diffraction area 52a, 52b, 52c and 52d of the hologram disc 52. However, in general the light spot originating from the optical scanning unit 20 has a Gaussian distribution in which the intensity symmetrically decreases around the maximum central axis. As a feature of the present invention, based on the symmetrical intensity distribution characteristics of light spots, the scanning reference position signal generator 43 outputs a scanning reference position signal at a point in time at which the output signals from the first and second photodetectors 41 and 42 have the same level.

Figure 4:
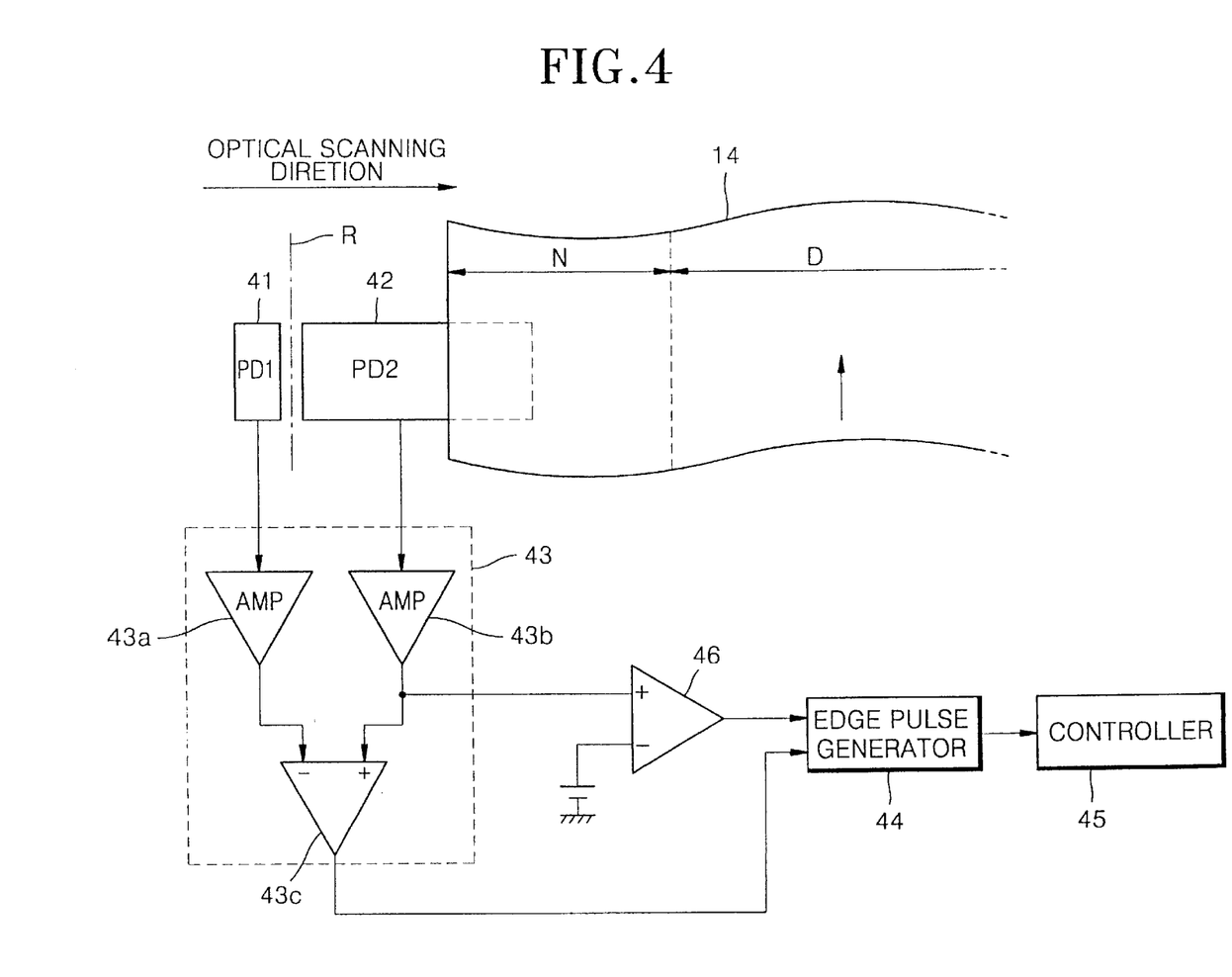
FIG. 4 is a circuit diagram of an example of the scanning reference position signal generator of FIG. 3.

An example of the scanning reference position signal generator 43 is shown in FIG. 4. Referring to FIG. 4, two amplifiers 43a and 43b receive and amplify the output signals of the first and second photodetectors (PD1 and PD2) 41 and 42, respectively, and a comparator 43c compares the amplified results. In particular, light emitted from the optical scanning unit 20 in a scanning direction is incident onto the first photodetector 41. At this time, the output of the comparator 43c is maintained at a low level. When the light beam emitted from the optical scanning unit 20 is nearly at the middle point between the first and second photodetectors 41 and 42, i.e., a reference position R, the output of the comparator 43c is changed to a high level. The point in time at which the level of the output signal from the comparator 43c is changed from a low level to a high level is determined to be the scanning reference position signal by the edge pulse generator 44.

In response to the outputting of the scanning reference position signal, the edge pulse generator 44 outputs an edge pulse signal whose width corresponds to a period of time from the reception of the scanning reference position signal to the receiving end point of the signal from the second photodetector 42. In FIG. 4, the output signal from the second photodetector 42, which is output in response to the light reception as mentioned previously, is input through a comparator 46 to the edge pulse generator 44. Here, the comparator 46 is incorporated so as to suppress a possible error in processing a received signal due to noise.

Figure 5:
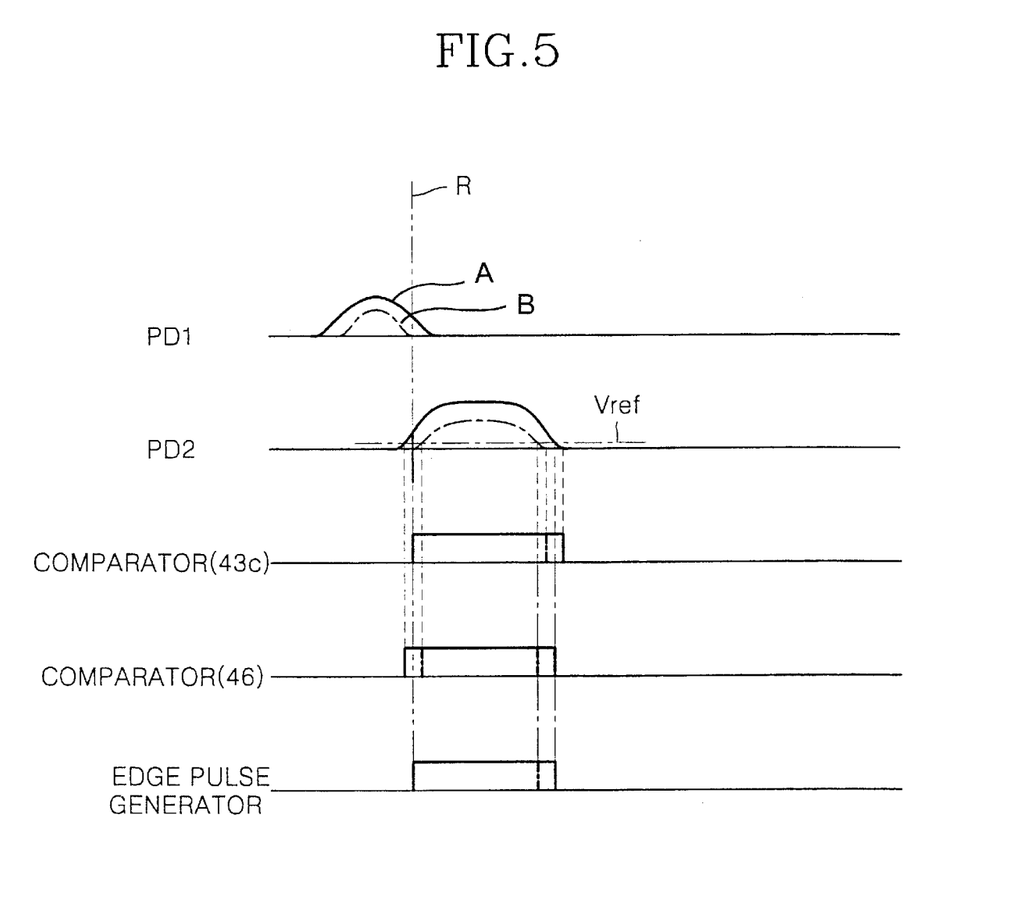
FIG. 5 illustrates the waveforms from some elements of FIG. 4.

Processing of the signal, from the first and second photodetectors 41 and 42 to the edge pulse generator 44, will be described in greater detail with reference to FIG. 5. In FIG. 5, the difference in the output signals of the first and second photodetectors (PD1 and PD2) 41 and 42, due to a difference in the amount of light reflected by the mirror sides 22a and 22b of the rotary polygon mirror 22, which is caused by processing errors, is expressed as solid lines A (corresponding to mirror side 22a) and dot-and-dashed lines B (corresponding to mirror side 22b). As previously mentioned, when light emitted from the optical scanning unit 20 scans the middle point between the first and second photodetectors 41 and 42, the light spot at the middle point has the symmetrical Gaussian distribution. As a result, the amount of light received by the first and second photodetectors 41 and 42 is the same regardless of which mirror side of the rotary polygon mirror 22 hits the light beam. Thus, a high level signal is output from the comparator 43c of the scanning reference position signal generator 43 at the point in time where the light scans the reference position R, in which the variation in the amount of light reflected by each mirror side of the rotary polygon mirror 22 does not affect the outputting of the scanning reference position signal. Accordingly, the timing of outputting pulse signals by the edge pulse generator 44 is not affected by the amount of light reflected from each mirror side 22a, 22b, etc. of the rotary polygon mirror 22. Therefore, error in determining scanning position, which occurs due to variation in the amount of light reflected by each mirror side 22a, 22b, etc. of the rotary polygon mirror 22, can be reduced.

The controller 45 controls the optical scanning unit 20 using the edge pulse signal output from the edge pulse generator 44, to emit light corresponding to image information starting from the image print region D of the photosensitive belt 14 from the reference position (R). The width of the edge pulse signal informs of the current position of the photosensitive belt 14. The controller 45 calculates the position of the photosensitive belt 14 and the starting point of the image write region D of the photosensitive belt 14, using the width of the edge pulse signal, and controls the driving of the light source 21 such that the light source 21 emits light corresponding to image information after a predetermined time delay required for reaching the starting point of the image print region D of the photosensitive belt 14, which has been calculated using the edge pulse signal. The time required for reaching the starting point of the image print region D is calculated from a rising or falling edge of the edge pulse signal.

Referring to FIG. 3, a belt steering portion 47 controls the roller 13, which is for use in steering the photosensitive belt 14 along a reference track. The steering roller 13 can tilt with respect to the traveling direction of the photosensitive belt 14, and the belt steering portion 47 adjusts the tilt angle of the steering roller 13, so that the photosensitive belt 14 travels along the reference track. The controller 45 calculates the amount of error, i.e., the degree of deviation from the reference track of the photosensitive belt 14, based on the width of the edge pulse signal, and controls the belt steering portion 47 to reduce the amount of error.

A process of printing an image from the starting point of the image print region D of the photosensitive belt 14, by the controller 45 using the edge pulse signal will be described.

First, the current position of the photosensitive belt 15 with respect to the optical scanning direction is calculated using the width of the edge pulse signal, and a predetermined time delay required to scan the starting point of the image print region D of the photosensitive belt 14 is calculated based on the calculated information on the position of the photosensitive belt 14.

The optical path from the optical scanning unit 20 to the photosensitive belt 14 may vary according to optical scanning direction, and thus it is preferable that information on a predetermined time delay from the occurrence of the scanning reference position signal to the scanning of the starting position of the image print region D of the photosensitive belt 14, which is calculated using the edge pulse signal in consideration of the optical scanning direction, is stored in a look-up table (LUT). Then, the controller 45 searches for the predetermined time delay information in the LUT, counts a predetermined delay time from the occurrence of the scanning reference position signal, and controls the driving of the light source 21 to emit light corresponding to image data after the predetermined time delay.

As described above, the printer according to the present invention can reduce an error in printing image information onto the image print region of the photosensitive belt even through there are variations in the amount of light scanning onto the photosensitive belt from the optical scanning unit.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. An optical scanning system for a printer, comprising:

an optical scanning unit having a deflector divided into a plurality of deflection regions to allow repetitive scanning of a beam of light emitted from a light source by rotation, said optical scanning unit scanning the beam of light onto a photosensitive belt traveling around a plurality of rollers;

a first photodetector installed at a position separated from an edge of the photosensitive belt, to be able to receive the beam of light scanned beyond the edge of the photosensitive belt;

a second photodetector installed a predetermined distance apart from said first photodetector, to be able to receive the beam of light scanned just beyond the edge of the photosensitive belt until the beam of light hits the edge of the photosensitive belt;

a first signal generator producing a scanning reference position signal when a signal output from said first photodetector in response to the reception of the beam of light and a signal output from said second photodetector in response to the reception of the beam of light have the same level;

a second signal generator producing an edge pulse signal having a width corresponding to the period from the reception of the scanning reference position signal until the beam of light reception of said second photodetector is terminated; and a controller calculating a degree of deviation from a reference track of the photosensitive belt in a direction perpendicular to the traveling direction of the photosensitive belt using the width of the edge pulse signal, said controller controlling the driving of said optical scanning unit such that the beam of light corresponding to image information is emitted onto the photosensitive belt beginning from the starting point of an image print region of the photosensitive belt.

2. The optical scanning system of claim 1, further comprising a belt steering portion controlling one of the rollers steering the photosensitive belt to allow the traveling of the photosensitive belt along the reference track, said controller controlling said belt steering portion to reduce the amount of deviation from a reference track of the photosensitive belt.

3. The optical scanning system of claim 1, with the deflector being a rotary polygon mirror having a plurality of mirror planes.

4. The optical scanning system of claim 1, with the deflector being a hologram disc divided into a plurality of regions with a diffraction grating.

5. The optical scanning system of claim 1, with said first and second photodetectors being separated from each other to the extent that both said first and second photodetectors share a light spot emitted from said optical scanning unit at the middle point between said first and second photodetectors.

6. The optical scanning system of claim 1, with said first signal generator further comprising:
   a first unit amplifying the signal output from said first photodetector;
   a second unit amplifying the signal output from said second photodetector; and
   a comparator comparing the amplified signals from said first and second units, the compared signal outputted to said edge pulse generator.

7. The optical scanning system of claim 6, with the predetermined distance between said first photodetector and second photodetector being determined according to the beam of light from said optical scanning unit forming a light spot on both said first and second photodetectors and the light spot being centered between said first and second photodetectors.

8. The optical scanning system of claim 7, with the scanning reference positional signal being determined by said second signal generator as the level of the output signal from said comparator being changed from a low level to a high level, the low level being when the beam of light emitted from said optical scanning unit in a scanning direction is incident onto said first photodetector, the high level being when the beam of light emitted from said optical scanning unit is adjacent to the middle point between said first and second photodetectors.

9. The optical scanning system of claim 8, further comprising a second comparator obtaining the amplified signal from said second unit, the output of said second comparator being sent to said second signal generator, said second comparator suppressing any error in processing in a received signal due to noise.

10. The optical scanning system of claim 9, with the driving of said optical scanning unit being when the optical scanning unit emits the beam of light corresponding to image information after a predetermined time delay required in reaching the starting point of the image print region of the photosensitive belt, the predetermined time delay being calculated using the edge pulse signal, the predetermined time delay being calculated from a rising or falling edge of the edge pulse signal.

11. An optical scanning system of a printer, comprising:
   an optical scanning unit having a deflector repeatedly scanning a beam of light emitted from a light source onto a photosensitive medium of the printer by rotating a driving source, the photosensitive medium used to transfer an image onto a printable medium;
   a first photodetector separated a predetermined distance from an edge of the photosensitive medium, the first photodetector receiving the beam of light emitted from said optical scanning unit beyond the edge of the photosensitive medium, said first photodetector outputting a signal corresponding to the received beam of light;
   a second photodetector receiving the beam of light emitted from said optical scanning unit and scanning just beyond the edge of the photosensitive medium until the beam of light hits the edge of the photosensitive medium;
   a first signal generator outputting a scanning reference position signal when the signal output from said first and second photodetectors have the same level;
   a second signal generator outputting an edge pulse signal in response to the outputting of the scanning reference position signal, the edge pulse signal having a width corresponding to a period of time from the reception of the scanning reference position signal to the receiving end point of the signal output from said second photodetector; and
   a controller controlling said optical scanning unit by using the edge pulse signal outputted from said second signal generator, to emit the beam of light corresponding to image information, said controller calculating the position of photosensitive medium and the starting point of an image write region using the width of the edge pulse signal.

12. The optical scanning system of claim 11, with said second photodetector being partially behind the photosensitive medium.

13. The optical scanning system of claim 12, with the photosensitive medium being a photosensitive belt circulating around a plurality of rollers.

14. The optical scanning system of claim 13, further comprising a belt steering portion controlling one of the rollers steering the photosensitive belt to allow the traveling of the photosensitive belt along the reference track, said controller controlling said belt steering portion to reduce the amount of deviation from a reference track of the photosensitive belt.

15. The optical scanning system of claim 14, with said first signal generator further comprising:
   a first unit amplifying the signal output from said first photodetector;
   a second unit amplifying the signal output from said second photodetector; and
   a comparator comparing the amplified signals from said first and second units, the compared signal outputted to said edge pulse generator.

16. The optical scanning system of claim 15, with a predetermined distance between said first photodetector and second photodetector being determined according to the beam of light from said optical scanning unit forming a light spot on both said first and second photodetectors and the light spot being centered between said first and second photodetectors.

17. The optical scanning system of claim 16, with the scanning reference positional signal being determined by said second signal generator as the level of the output signal from said comparator being changed from a low level to a high level, the low level being when the beam of light emitted from said optical scanning unit in a scanning direction is incident onto said first photodetector, the high level being when the beam of light emitted from said optical scanning unit is adjacent to the middle point between said first and second photodetectors.

18. The optical scanning system of claim 17, further comprising a second comparator obtaining the amplified signal from said second unit, the output of said second comparator being sent to said second signal generator, said second comparator suppressing any error in processing in a received signal due to noise.

19. The optical scanning system of claim 18, with the driving of said optical scanning unit being when the optical scanning unit emits the beam of light corresponding to image information after a predetermined time delay required in reaching the starting point of the image print region of the photosensitive belt, the predetermined time delay being calculated using the edge pulse signal, the predetermined time delay being calculated from a rising or falling edge of the edge pulse signal.

20. The optical scanning system of claim 19, with the deflector being a rotary polygon mirror having a plurality of mirror planes.

21. The optical scanning system of claim 19, with the deflector being a hologram disc divided into a plurality of regions with a diffraction grating.

22. A method for an optical scanning system of a printer, comprising:

installing an optical scanning unit having a deflector divided into a plurality of deflection regions to allow repetitive scanning of a beam of light emitted from a light source by rotation, said optical scanning unit scanning the beam of light onto a photosensitive belt traveling around a plurality of rollers;

positioning a first photodetector at a location separated from an edge of the photosensitive belt to be able to receive the beam of light scanned beyond the edge of the photosensitive belt;

installing a second photodetector at a predetermined distance apart from said first photodetector, to be able to receive the beam of light scanned just beyond the edge of the photosensitive belt until the beam of light hits the edge of the photosensitive belt;

installing a first signal generator producing a scanning reference position signal when a signal output from said first photodetector in response to the reception of the beam of light and a signal output from said second photodetector in response to the reception of the beam of light have the same level;

installing a second signal generator producing an edge pulse signal having a width corresponding to the period from the reception of the scanning reference position signal until the the beam of light reception of said second photodetector is terminated;

installing a controller determining a degree of deviation from a reference track of the photosensitive belt in a direction perpendicular to the traveling direction of the photosensitive belt using the width of the edge pulse signal, said controller controlling the driving of said optical scanning unit such that the beam of light corresponding to image information is emitted onto the photosensitive belt beginning from the starting point of an image print region of the photosensitive belt; and inserting a belt steering portion controlling one of the rollers steering the photosensitive belt to allow the traveling of the photosensitive belt along the reference track, said controller controlling said belt steering portion to reduce the amount of deviation from a reference track of the photosensitive belt.

23. The method of claim 22, with the predetermined distance between said first photodetector and second photodetector determined according to the beam of light from said optical scanning unit forming a light spot on both said first and second photodetectors and the light spot being centered between said first and second photodetectors.

24. The method of claim 23, further comprising:

determining a current position of the photosensitive belt with respect to an optical scanning direction using the width of the edge pulse signal;

determining a predetermined time delay from the occurrence of the scanning reference position signal to the scanning of the starting position of the image print region of the photosensitive belt according to the determination of the current position of the photosensitive belt and according to the edge pulse signal in consideration of the optical scanning direction;

storing said predetermined time delay in a look-up table;

searching by said controller said predetermined time delay information in said look-up table; and controlling the driving of the light source from said optical scanning unit to emit the beam of light corresponding to image data after said predetermined time delay.

* * * * *